(12) United States Patent
Gloisten (10) Patent No.: US 6,726,348 B2
(45) Date of Patent: Apr. 27, 2004

(54) ILLUMINATION ASSEMBLY AND ADJUSTABLE DIRECTION MOUNTING

(75) Inventor: Jennifer L. Gloisten, Farmingville, NY (US)

(73) Assignee: B/E Aerospace, Inc., Holbrook, NY (US)

(*) Notice: Subject to any disclaimer, the term of this patent is extended or adjusted under 35 U.S.C. 154(b) by 0 days.

(21) Appl. No.: 10/106,942

(22) Filed: Mar. 26, 2002

(65) Prior Publication Data

US 2003/0185014 A1 Oct. 2, 2003

(51) Int. Cl.[7] ............................................. F21V 33/00
(52) U.S. Cl. ........................ 362/372; 362/249; 362/362; 362/368; 362/370; 362/371; 362/425; 362/287
(58) Field of Search ................................. 362/376, 371, 362/372, 249, 250, 287, 427, 362, 368

(56) References Cited

U.S. PATENT DOCUMENTS

| | | | |
|---|---|---|---|
| 2,089,226 A | 8/1937 | Roper | |
| 2,597,680 A | 5/1952 | Sissler | |
| 3,604,916 A | 9/1971 | Adra et al. | |
| 4,092,528 A | 5/1978 | Puyplat | |
| 4,386,391 A * | 5/1983 | Gulliksen et al. | 362/232 |
| 4,654,629 A | 3/1987 | Bezos et al. | |
| 4,814,667 A | 3/1989 | Tanaka | |
| 4,943,900 A | 7/1990 | Gärtner | |
| 5,057,985 A * | 10/1991 | Kreutzer et al. | 362/425 |
| 5,103,382 A | 4/1992 | Kondo et al. | |
| 5,416,679 A | 5/1995 | Ruskouski et al. | |
| 5,642,934 A | 7/1997 | Haddad | |
| 5,934,798 A * | 8/1999 | Roller et al. | 362/497 |
| 6,158,882 A | 12/2000 | Bischoff, Jr. | |
| 6,347,880 B1 * | 2/2002 | Furst et al. | 362/494 |
| 6,582,103 B1 | 6/2003 | Popovich et al. | |
| 2002/0191386 A1 * | 12/2002 | Cleaver et al. | 362/31 |

FOREIGN PATENT DOCUMENTS

WO     WO01/07828     2/2001

* cited by examiner

*Primary Examiner*—Sandra O'Shea
*Assistant Examiner*—James W Cranson, Jr.
(74) *Attorney, Agent, or Firm*—Collard & Roe, P.C.

(57) ABSTRACT

An illumination assembly includes a support bracket adapted for mounting on a support structure and a housing adjustably connected to the support bracket. A directional light source is mounted within the housing. A cam follower/locking-mechanism connected to the support bracket and the housing angularly adjusts the housing to a selected position relative to the support bracket and locks the housing in the selected position. Also provided is an adjustable directional mounting for a directional light source.

13 Claims, 6 Drawing Sheets

ILLUMINATION ASSEMBLY AND ADJUSTABLE DIRECTION MOUNTING

BACKGROUND OF THE INVENTION

1. Field of the Invention

The present invention relates to lighting systems and more particularly to an illumination assembly with an adjustable direction mounting which uses a directional light source such as light emitting diodes suitable for interior lighting in aviation applications.

2. The Prior Art

Fluorescent lighting systems have been used in general and commercial aviation. Disadvantages of such systems include the cost associated with lamp breakage and the dangers associated with high voltage.

Light emitting diodes (LEDs) as a source of light offer several benefits over fluorescent systems such as solid state reliability, long life, reduced heat dissipation, and reduced energy use, with little or no added weight.

An LED light source is highly directional, providing most light in one orientation as opposed to the continuous radial distribution of light around a fluorescent tube. The combination of mounting, location, filtering and distribution of white LEDs in a multi-LED design is critical to achieving an aesthetic light output. The directional nature of the diodes themselves creates a situation where a slight angular change in installation can significantly change the appearance of lighted areas. Filtering may be employed to convert the color temperature of the light emitted from the diodes to a warmer color temperature as produced by traditional light sources, and to blend the light produced by adjacent LEDs so that variations in color temperature between individual LEDs are not noticeable.

SUMMARY OF THE INVENTION

An illumination assembly is provided, for use, for example, as a wash light in aviation applications. In one aspect, the assembly includes a support bracket preferably made from an extruded plastic material, which is adapted for mounting on a support structure. A housing is adjustably connected to the support bracket, an electronic assembly is mounted within the housing, and a directional light source such as an LED light source is mounted on the electronic assembly. A cam follower/locking mechanism is connected to the support bracket and the housing for angularly adjusting the housing to a selected position relative to the support bracket and locking the housing in the selected position.

Preferably, the electronic assembly includes at least one, preferably two elongated circuit boards disposed over and parallel to each other, one of the boards carrying the LED or other directional light source and the other of the boards carrying driving and thermal protection circuitry for the light source.

The electronic assembly may be mounted within the housing via two attached rails which mate with elements or features internal to the housing such that assembly is accomplished by sliding the rails into the receiving elements in the housing.

Preferably, the support bracket includes a cradle which may be cylindrical and the housing includes a tube received by the cradle defining an interior space. The cam follower/locking mechanism preferably extends through a bottom portion of the cradle into the interior space to apply force to rotate the housing. The support bracket preferably includes a plurality of rivets riding in a plurality of circumferential slots in the housing. A longitudinally angled slot is disposed in a lower portion of the housing to permit the housing to rotate up to approximately 110 degrees around an axis of rotation parallel to the length of the support bracket upon application of force by the cam follower/locking mechanism.

The cam follower/locking mechanism preferably includes a headed shaft which engages the longitudinally angled slot, an indicator bracket extending around to a front portion of the support bracket, a knob having a surface interfacing with the indicator bracket and a counter bore for receiving a rubber O-ring captured underneath a washer and a screw.

Preferably, the interface surface of the knob includes an inclined portion and a planer portion having at least two indentations. The indicator bracket preferably includes at least two raised protrusions corresponding to the indentations, which are adapted to rotationally travel along the inclined portion on the knob's interface surface upon rotation of the knob relative to the indicator bracket and to be received within the indentations.

The support bracket preferably has a flat front surface with markings indicating a series of light direction angles relative to a back mounting surface of the support bracket. The indicator bracket preferably includes a pointer riding along the flat front surface on the support bracket to provide a reading of the light direction angle. A portion of longitudinally angled slot is varied so as to permit fine adjustment around a selected angular position.

In another aspect, an adjustable direction mounting for a directional light source is provided. The mounting includes a support bracket adapted for mounting on a support structure, and a housing adjustably connected to the support bracket. The housing has a longitudinally angled slot in a lower portion of the housing. A shaft is disposed in the longitudinally angled slot for slidable movement relative to the support bracket, and a means is provided for securing the shaft in a selected fixed position.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denotes similar elements throughout the several views.

DETAILED DESCRIPTION OF PREFERRED EMBODIMENTS

Figure 1:
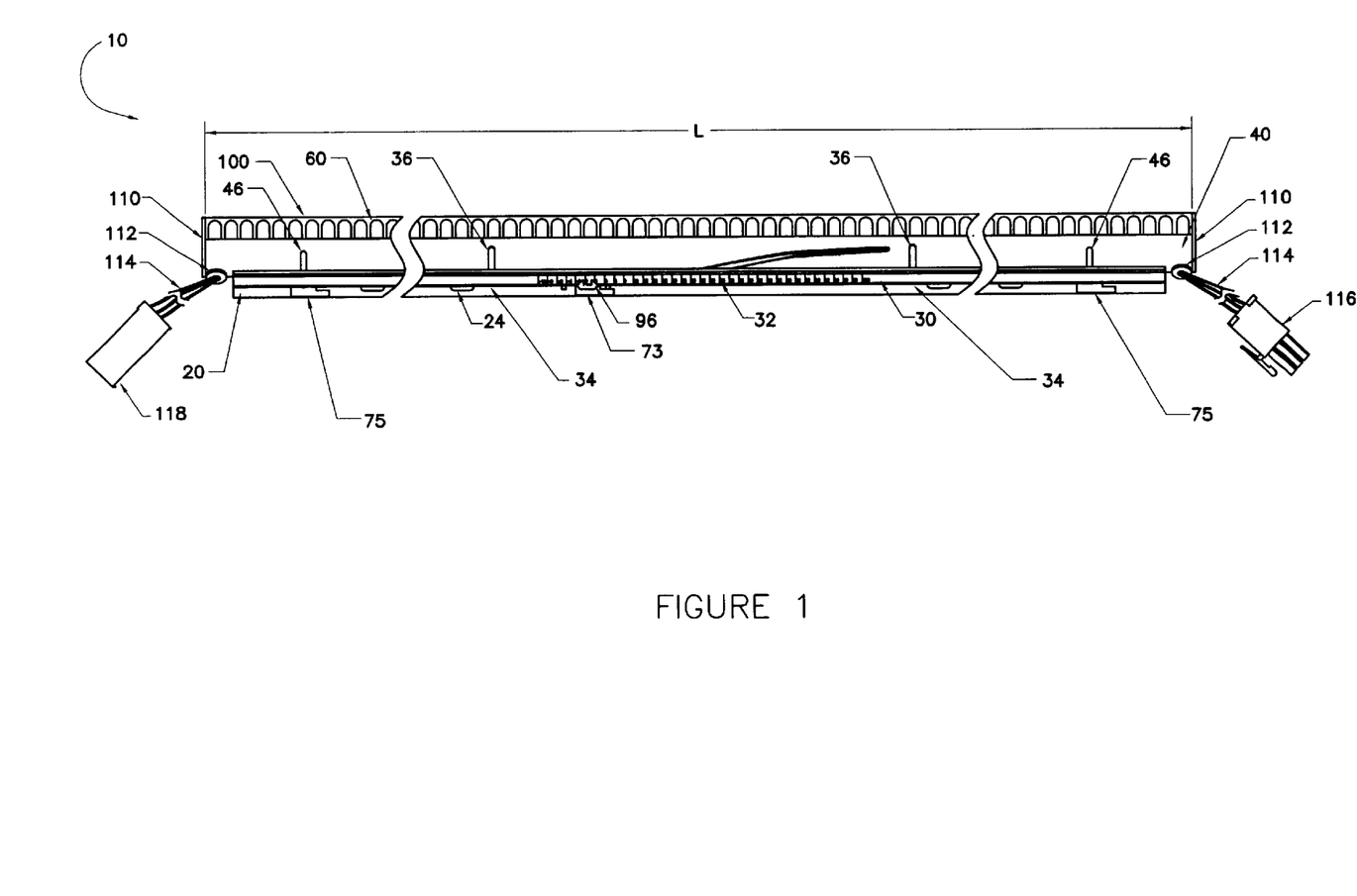
FIG. 1 is a front view of an embodiment of the present invention.
Figure 2:
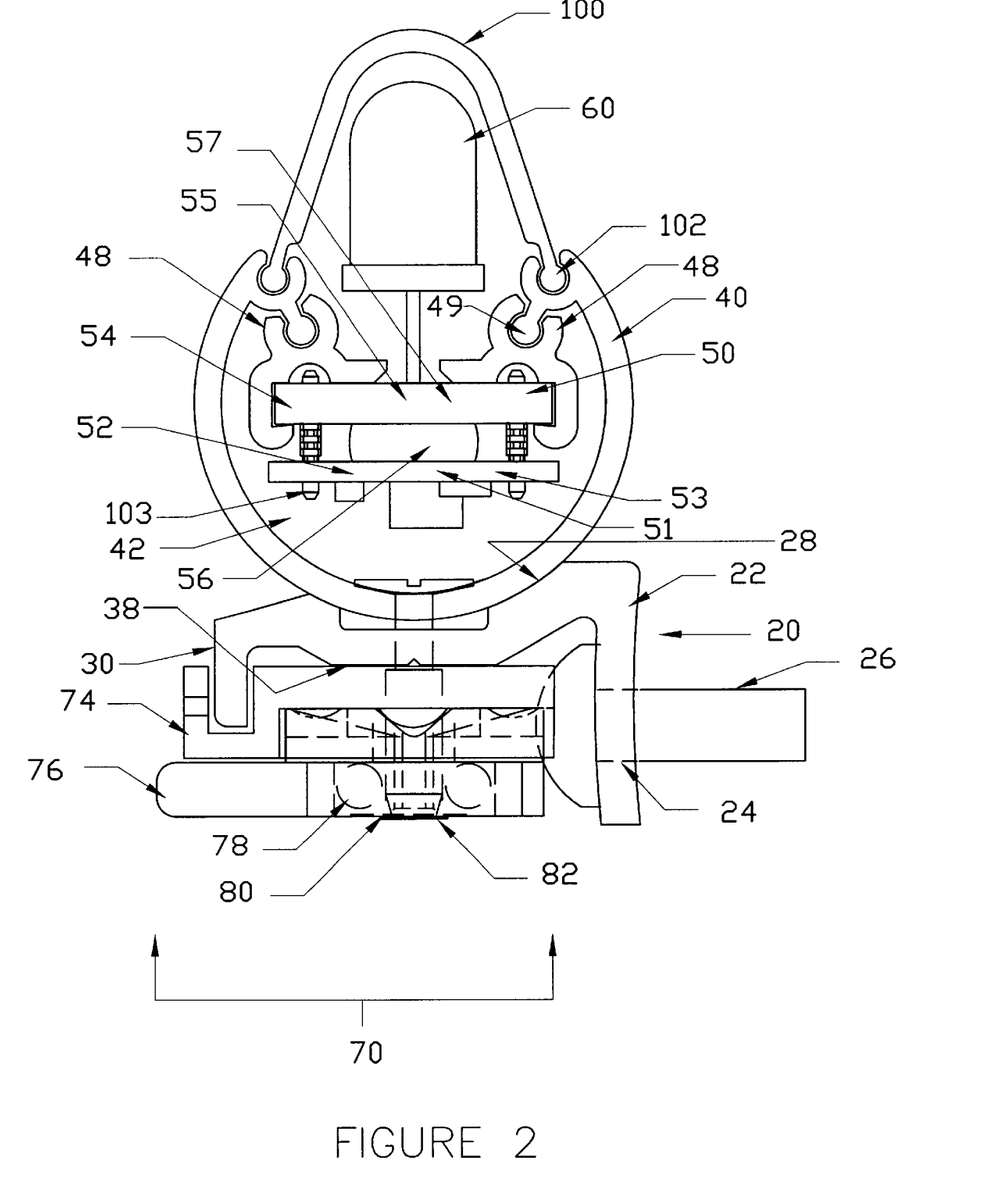
FIG. 2 is a sectional view of the embodiment of FIG. 1.
Figure 3:
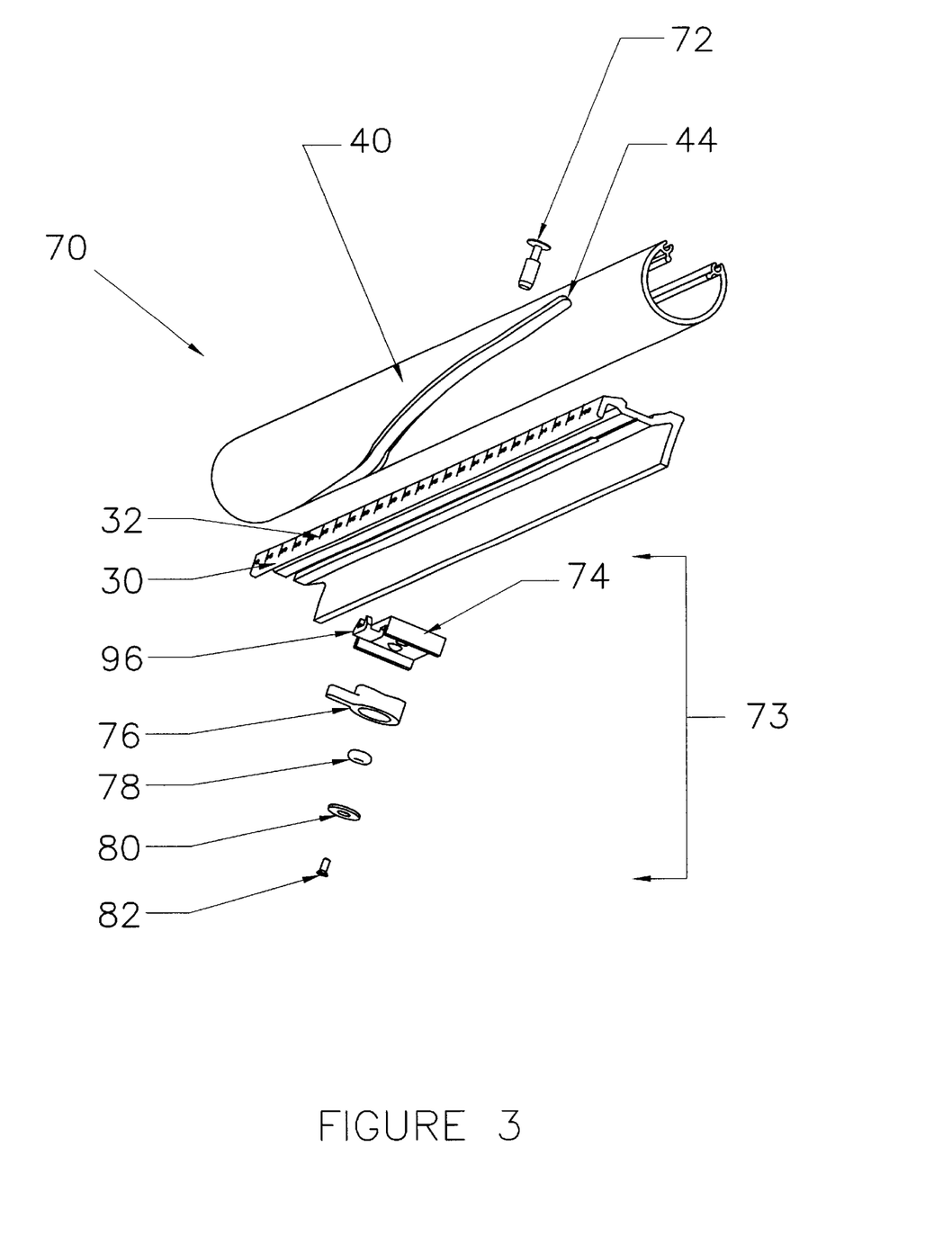
FIG. 3 is a front exploded view of the embodiment of FIG. 1 illustrating the cam mechanism.

Turning now in detail to the drawings, FIGS. 1–3 show an illumination assembly of a preferred embodiment. Assembly
}

10 includes a support bracket 20 adapted for mounting on a support structure (not shown) and a housing 40 adjustably connected to support bracket 20. Support bracket 20 is preferably made from an extruded plastic material such as extruded polycarbonate/polyetherimide, or other engineering plastic material of dimensional stability. Preferably, support bracket 20 has a flat or slightly cambered side 22 provided with openings 24 for mounting it to a surface via a fastener such as screw 26. Another side preferably has a cylindrical cradle 28 designed to receive housing 40. Housing 40 is preferably tube shaped with a radius of curvature corresponding to the radius of curvature of cylindrical cradle 28. Snap rivets or other fasteners 34 may be used to fasten housing 40 to support bracket 20 through openings such as slots 36 machined circumferentially around housing 40. For example, snap rivet 34 may protrude through the bottom 38 of cradle 28 at the bottom or side of cradle 28. Snap rivets 34 capture housing 40 so that housing 40 may rotate in cradle 28 along its longitudinal axis without housing 40 shifting longitudinally in cradle 28. Preferably the axis of rotation is parallel to the length L of support bracket 20, and housing 40 rotates approximately 110 degrees about its axis. For example, the bracket may rotate from −10° to 110° with 0° being straight up. A third side 30 of support bracket 20 has a flat front surface with markings 32 indicating a series of light direction angles relative to back mounting surface 22.

Housing 40 defines an interior space 42 in which an electronic assembly 50 is mounted. A directional light source, such as an LED light source 60, is mounted on electronic assembly 50.

Electronic assembly 50 includes at least one, preferably two, elongated relatively narrow circuit boards 52, 54 disposed over and parallel to each other. In the embodiment shown, upper board 54 carries the LEDS of LED light source 60. Lower board 52 carries driving and thermal protection circuitry for LED light source 60. Alternatively, one board carries both the series of LEDs and the driving and thermal protection circuitry. Electrical connection between boards 52, 54 is preferably achieved using soldered pins 103 so as to create and maintain a consistent minimum spacing between the two board assemblies. A thermally conductive material such as silicone 56 is preferably placed between boards 52, 54 to keep the boards at the same temperature and to enhance the mechanical properties of the dual board assembly.

In order to facilitate producing board assemblies that are easily matched to requirements of a particular user, both circuit boards 52, 54 are preferably separated into two main operating board units 51, 53 and 55, 57, respectively. For systems designed for general or wash lighting, the basic assembly preferably includes two boards 51, 55 of approximately 8.75 inches in length carrying the appropriate number of LEDs for the 8.75-inch length and the basic circuitry required for operation of a wash light unit. Adder boards 53, 57 are preferably used to provide the additional length of LEDs and supporting electronics. The adder boards are preferably divided into uniform length separable segments. In this way, wash light units may be readily manufactured from a selected minimum, for example 9 inches in length, and be increased in length in selected increments such as 1.5 inches.

Electronic assembly 50 is preferably mechanically secured to guides 48 in housing 40, which are preferably formed from an extruded polycarbonate or other engineering material. Preferably, the long top edges of LED board 54 are glued to guides 48. This arrangement provides rigidity to the board assembly and an attachment feature to secure the board assembly into housing 40. Each guide 48 preferably is in the form of a clip as shown in FIG. 2, which runs the length of the extrusion and interlocks with two tabs 49 internal to housing tube 40. In addition to mechanical structure, the glue interface between LED board 54 and guide 48 forms a thermal interface for conductive heat transfer to housing 40.

Force to rotate housing 40 is applied via a cam follower/locking mechanism 70 connected to support bracket 20 and housing 40. Cam follower/locking mechanism 70 extends through the bottom of cradle 28 into housing 40. Cam follower/locking mechanism 70 allows the installer to set the direction in which LEDs 60 point, either before or after installation of illumination assembly 10 in an aircraft or other vehicle, and to lock the assembly in that position. Slot 44 cut at an angle and extending generally longitudinally along the lower portion of housing 40 provides the cam surface to which the follower applies driving force.

Figure 5A:
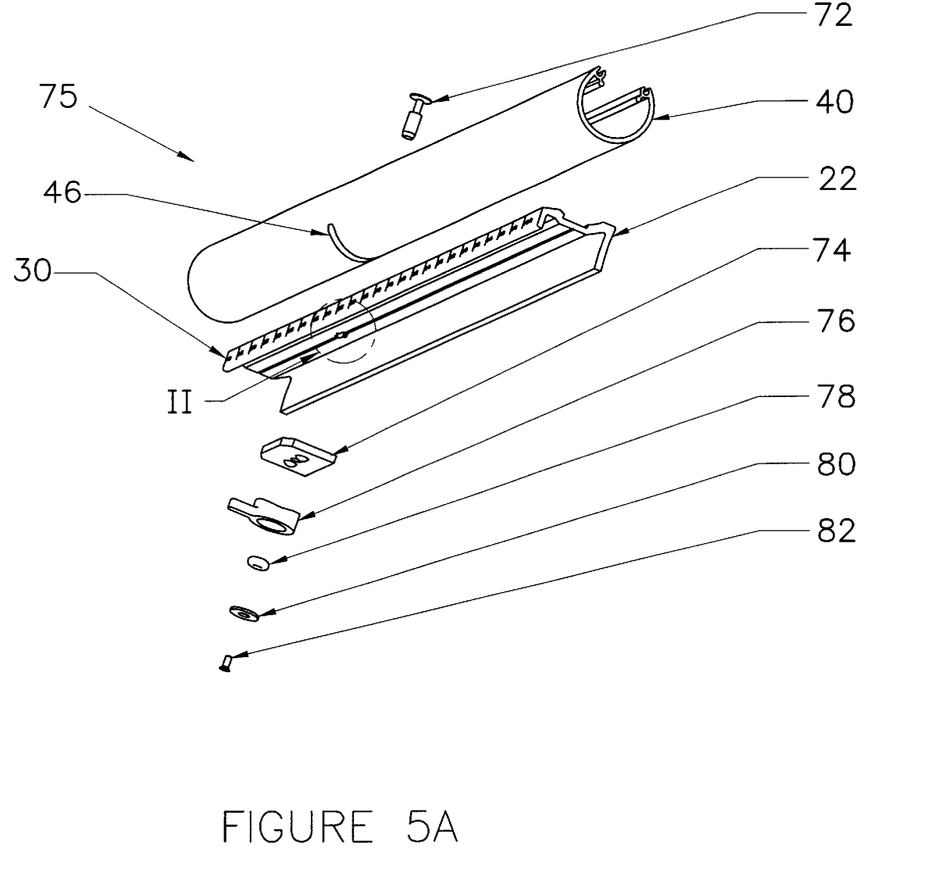
FIG. 5A is an exploded view of a locking assembly used in an alternate embodiment.

Cam follower/locking mechanism 70 preferably includes a headed shaft 72 which engages or captures the longitudinally angled cam slot 44 in housing 40 and an indicator assembly 73. Alternatively, as shown in FIG. 5A, cam follower/locking mechanism 70 contains a lock assembly 75 without an indicator assembly, and indicator assembly 73 may be omitted or made separate from the lock assembly 75 as shown in FIG. 1. Indicator assembly 73 preferably includes an indicator bracket 74, a knob 76, a rubber O-ring 78, a washer 80, and a screw 82. As shown in FIGS. 2–3, indicator bracket 74 extends around to a front portion 30 of support bracket 20.

Figures 6A, 6B:
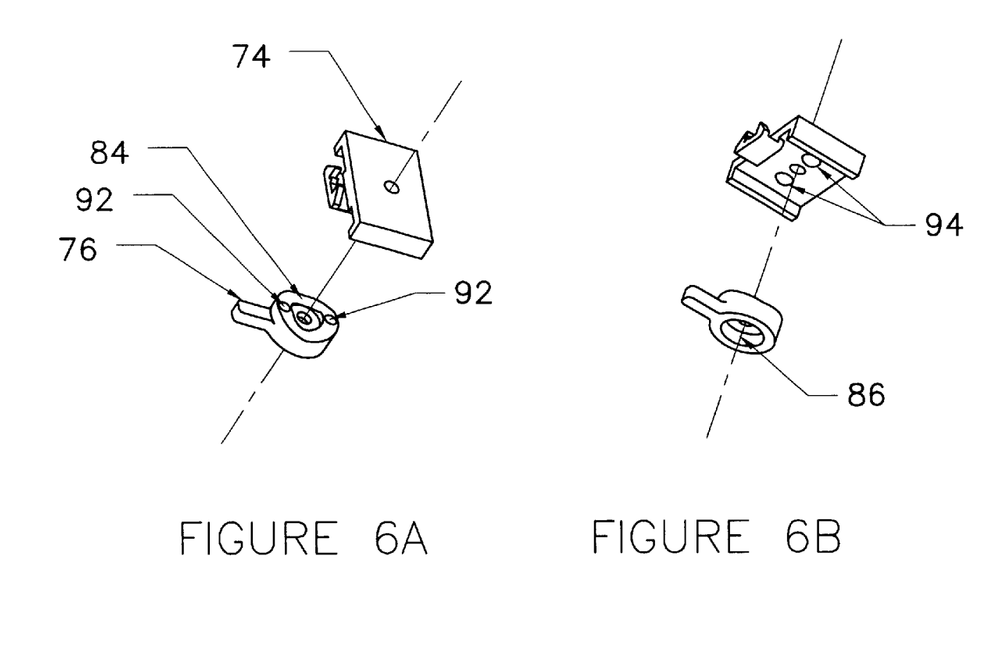
FIGS. 6A, 6B and 6C are exploded views from the top and bottom respectively of an indicator/lock assembly used in the embodiment of FIG. 1, which is shown to approximate the unlocked position.

As shown in FIG. 6A, knob 76 has an interface surface 84 which interfaces with indicator bracket 74. As shown in FIGS. 3 and 6B, knob 76 has a counter bore 86 for receiving O-ring 78, washer 80, and screw 82. O-ring 78 is disposed beneath and trapped by washer 80 and screw 82 to provide spring tension for the locking mechanism. A spring or other device to provide tension may be used in place of the O-ring.

Figure 5B:
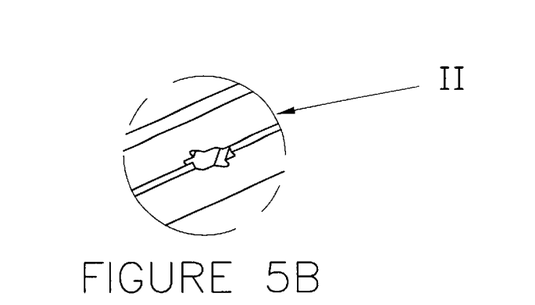
FIG. 5B is an enlarged view of area II of FIG. 5A.

Depending on particular length requirements, the locking mechanism may be added at intervals, interfacing with a circumferential slot instead of the longitudinally angled slot. In the embodiment shown in FIG. 5A, indicator bracket 74 is replaced by bracket 74' which is a modified form of indicator bracket 74 without a pointer or indicator member. As shown in FIG. 5B, bracket 74' mounts into support bracket 20 between back mounting surface 22 and the third flat side 30 of support bracket 20.

Figure 6C:
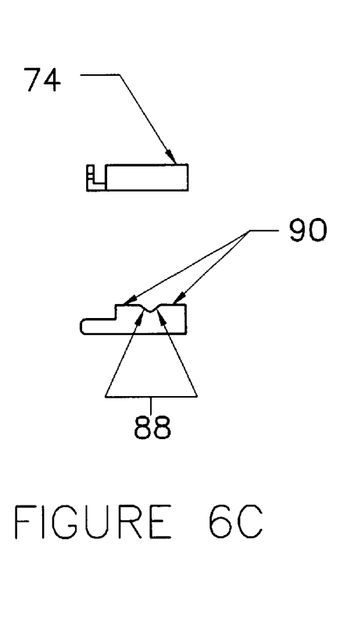

A locked condition is created by rotating knob 76 relative to indicator bracket 74. As shown in FIGS. 6A and 6C, interface surface 84 of knob 76 includes at least two inclined portions or linear ramps 88 and at least two planar portions or mesas 90, each planar portion 90 having at least one spherical cut or indentation 92. As shown in FIG. 6B, indicator bracket 74 carries at least two raised spherical protrusions or bumps 94 corresponding to indentations 92. Protrusions 94 are adapted to rotationally travel along inclined portions 88 on knob interface surface 84 upon rotation of knob 76 relative to indicator bracket 74 and be received within the matching indentations 92 in planar portions 90. Protrusions 94 are forced into indentations 92 by the compression of O-ring 78 providing a positive lock that is overcome only by manually forcing rotation of knob 76.

Alternatively, knob 76 may be provided with protrusions 94 and indicator bracket 74 may be provided with corresponding indentations 92.

Figure 4A:
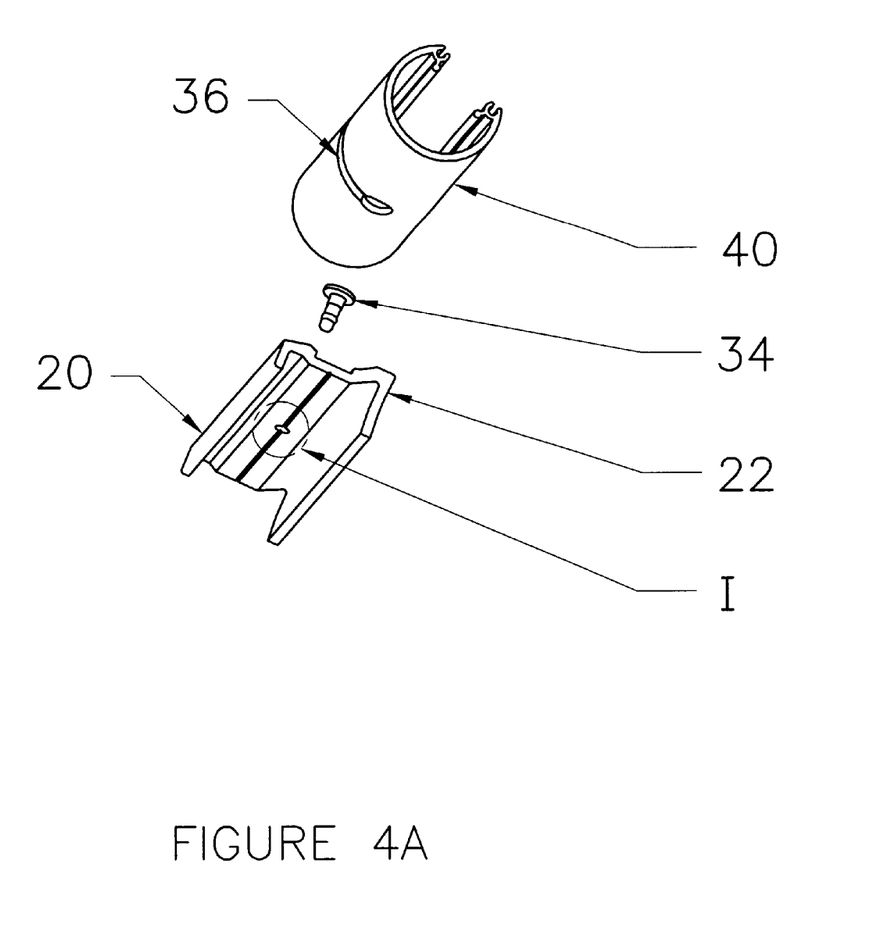
FIG. 4A is an exploded view of a snap rivet assembly used in the embodiment of FIG. 1.
Figure 4B:
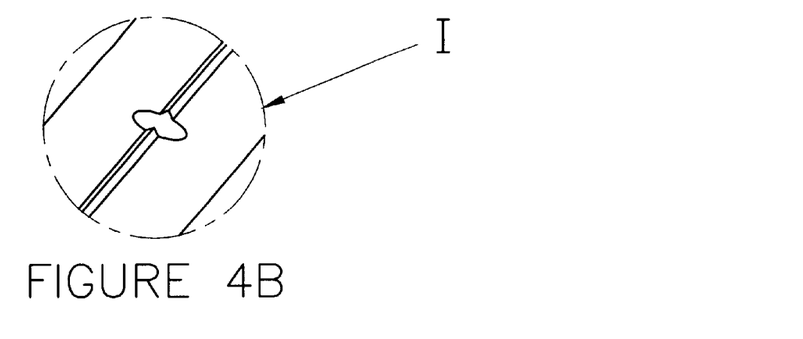
FIG. 4B is an enlarged view of area I of FIG. 4A.

Housing 40 is provided with preferably circumferential slots 36 that receive rivets 34 to prevent relative longitudinal movement between housing 40 and support bracket 20 as shown in FIG. 4 when force is applied to cam follower locking mechanism. Rotation results from cam follower locking mechanism 70 driving headed shaft 72 through longitudinally angled slot 44. As shown in FIGS. 4A and 4B, rivet 34 is mounted in support bracket 20 between back mounting surface 22 and third flat side 30 of support bracket 20.

Indicator bracket 74 preferably includes a pointer 96 on the portion of indicator bracket 74 extending around the front of support bracket 20. Pointer 96 rides along flat front surface 32 of support bracket 20 to provide a reading of the light direction angle corresponding to the longitudinal location of the headed shaft 72 in angled slot 44. As cam/locking mechanism 70 is slid from side to side varying the light direction, markings 32 on flat surface 30 provide an angle reading showing the light direction relative to the back mounting surface 22 of support bracket 20. Preferably, cam slot angle is varied in such a way as to provide finer adjustments around the 0 and 90 degree positions, because these positions are the most common installation orientations.

As shown in FIG. 5A, locking assembly 75 including the cam/follower locking mechanism mounted in a circumferential slot 46 instead of the longitudinal cam slot 44 may be placed as required along the length of the unit to allow adequate retaining force such that the housing tube does not rotate under vibratory conditions.

A lens 100 preferably is disposed over housing 40 to cover LED light source 60. By variation of the color and the texture of lens 100 which covers the LEDs, one may achieve color temperature correction and diffusion. Preferably, lens 100 is extruded from a plastic material, resulting in a long channel shaped sheet of clear or tinted material, terminating along both bottom edges in a cylindrical expansion 102. Cylindrical expansion 102 serves as a tab which interlocks with a clip-shaped structure formed on the open edge of housing tube 40' adjacent to the opening through which the LEDs extend. Lens 100 may be slid into housing 40 lengthwise or snapped into the clip-shaped structures from the end. Techniques for imparting diffusion properties to lens 100 include adding surface texture across the entire interior surface of the lens, or just along the interior surface of the sides to improve lateral diffusion.

At both ends of the unit, end caps 110 are preferably glued or snap fit to the assembly to seal the lateral openings of the housing 40 and lens 100. Each end of tube housing 40 preferably carries a grommet 112 where wires 114 may egress to connectors 116, 118, male at one end and female at the other. This arrangement allows units to be easily installed and electrically connected end to end.

Preferably, installation of illumination assembly 10 requires no additional power supplies or converters when supplied from 28 VDC. The unit may be mounted and connected end to end to provide an uninterrupted wash of light. Minimal clearance is required between units to allow for thermal expansion. Various dimming systems may be provided to interface with the unit, allowing the light to be varied from 0 to 100 percent.

As will be apparent to one skilled in the art, the adjustable direction mounting described above may be used to mount other directional light sources other than light emitting diodes. The mounting includes a support bracket 20, preferably having a plurality of rivets 34, which is adapted for mounting on a support structure (not shown). A housing 40 which may be cylindrical is adjustably affixed or connected to support bracket 20. Housing 40 has a longitudinally angled slot 44 in a lower portion of the housing and preferably circumferential slots 36 which receive rivets 34. A shaft 72 is disposed in longitudinally angled slot 44 for slidable movement relative to support bracket 20. A means, for example, indicator assembly 73, is also provided securing shaft 72 in a selected fixed position. The adjustable direction mounting may be adapted to mount any directional light source. For example, for LEDs, a circuit board or boards 52, 54 may be mounted within housing 40 and a series of LEDs 60 mounted on the circuit board.

While a few embodiments of the present invention have been shown and described, it is to be understood that many changes and modifications may be made there unto without departing from the spirit and scope of the invention as defined in the appended claims.

What is claimed is:

1. An illumination assembly comprising:
   (a) a support bracket adapted for mounting on a support structure;
   (b) a housing adjustably connected to said support bracket;
   (c) an electronic assembly mounted within said housing comprising at least two elongated circuit boards disposed over and parallel to each other;
   (d) at least one soldered pin electrically connecting and maintaining a minimum spacing between said at least two elongated circuit boards;
   (e) a thermally conductive material between said at least two elongated circuit boards to keep the boards at a common temperature and to enhance said electronic assembly mechanically;
   (f) a directional light source carried by one of said circuit boards, the other of said circuit boards carrying driving and thermal protection circuitry for said directional light source; and
   (g) a cam follower/locking mechanism connected to said support bracket and said housing for angularly adjusting the housing to a selected position relative to said support bracket and locking said housing in said selected position.

2. The illumination assembly according to claim 1 wherein said support bracket is made from an extruded plastic material and said directional light source comprises an LED light source.

3. The illumination assembly according to claim 1 wherein said electronic assembly comprises at least one elongated circuit board carrying said directional light source and said driving and thermal protection circuitry for said light source.

4. The illumination assembly according to claim 1 further comprising at least two guides connected to said housing, said electronic assembly being adhesively mounted to said guides.

5. The illumination assembly according to claim 4 wherein each of said guides comprises a clip extending lengthwise along said tube and said tube comprises at least two tabs, a respective one of said tabs interlocking with a corresponding clip to secure said electronic assembly to said housing.

6. The illumination assembly according to claim 1 wherein:
   (a) said support bracket comprises a plurality of circumferential slots adapted to receive a plurality of rivets to prevent longitudinal movement between said housing and said support bracket and (b) said housing further comprises a longitudinally angled slot in a lower portion of said housing to permit said housing to rotate up to approximately 110 degrees around an axis of rotation parallel to the length of said support bracket upon application of force to said cam follower/locking mechanism.

7. The illumination assembly according to claim 6 wherein said cam follower/locking mechanism comprises a headed shaft, said headed shaft engaging said longitudinally angled slot, an indicator bracket extending around to a front portion of said support bracket, a knob having an interface surface interfacing with said indicator bracket and having a counter bore for receiving a rubber O-ring, a washer and a screw, said O-ring being disposed beneath said washer and said screw.

8. The illumination assembly according to claim 7 wherein said interface surface of said knob comprises at least two inclined portions and at least two planar portions, each planar portion having at least one indentation, and said indicator bracket comprises at least two raised protrusions, each raised protrusion corresponding to a respective indentation and adapted to rotationally travel along a respective inclined portion on said interface surface upon rotation of said knob relative to said indicator bracket and be received within said respective indentation.

9. The illumination assembly according to claim 7 wherein said support bracket has a flat front surface with markings indicating a series of light direction angles relative to a back mounting surface of said support bracket and said indicator bracket comprises a pointer riding along said flat front surface on said support bracket to provide a reading of the light direction angle.

10. The illumination assembly according to claim 9 wherein a portion of the longitudinally angled slot is varied so as to permit fine adjustment around a selected angular position.

11. An illumination assembly with an adjustable direction mounting, which comprises:
(a) a support bracket having a plurality of rivets;
(b) a cylindrical housing adjustably affixed to said support bracket, said housing having circumferential slots receiving said rivets and a longitudinally angled slot in a lower portion of said housing;
(c) a circuit board mounted within said housing;
(d) a series of LEDs mounted on said circuit board;
(e) a shaft disposed in said longitudinally angled slot for slidable movement relative to said support bracket; and
(f) means for securing said shaft in a selected fixed position.

12. An adjustable direction mounting for a directional light source comprising:
(a) a support bracket adapted for mounting on a support structure;
(b) a housing adjustably connected to said support bracket, said housing having a longitudinally angled slot in a lower portion of said housing;
(c) a shaft disposed in said longitudinally angled slot for slidable movement relative to said support bracket; and
(d) means for securing said shaft in a selected fixed position.

13. An illumination assembly comprising:
(a) a support bracket comprising a cradle adapted for mounting on a support structure;
(b) a housing adjustably connected to said support bracket comprising a tube received by said cradle defining an interior space;
(c) an electronic assembly mounted within said housing;
(d) a directional light source mounted on said electronic assembly; and
(e) a cam follower/locking mechanism connected to said support bracket and said housing for angularly adjusting the housing to a selected position relative to said support bracket and locking said housing in said selected position, said cam follower/locking mechanism extending through a bottom portion of said cradle into the interior space to apply force to rotate the housing.

* * * * *

UNITED STATES PATENT AND TRADEMARK OFFICE
CERTIFICATE OF CORRECTION

PATENT NO. : 6,726,348 B2
DATED : April 27, 2004
INVENTOR(S) : Gloisten

It is certified that error appears in the above-identified patent and that said Letters Patent is hereby corrected as shown below:

Column 6,
Lines 47, 52 and 62, "claim 1" should correctly read -- claim 13 --.

Signed and Sealed this

Nineteenth Day of October, 2004

JON W. DUDAS
*Director of the United States Patent and Trademark Office*